Dec. 19, 1967 W. H. SLAVIK 3,359,453

HORIZONTAL SCAN WIDTH AND HIGH VOLTAGE REGULATION CIRCUIT FOR TELEVISION RECEIVERS

Filed Nov. 27, 1963 2 Sheets-Sheet 1

INVENTOR.
William H. Slavik

BY Mueller & Aichele

Attys.

Dec. 19, 1967 W. H. SLAVIK 3,359,453

HORIZONTAL SCAN WIDTH AND HIGH VOLTAGE REGULATION
CIRCUIT FOR TELEVISION RECEIVERS

Filed Nov. 27, 1963 2 Sheets-Sheet 2

INVENTOR.
William H. Slavik

BY Mueller & Aichele

Attys.

United States Patent Office 3,359,453

Patented Dec. 19, 1967

3,359,453

HORIZONTAL SCAN WIDTH AND HIGH VOLTAGE REGULATION CIRCUIT FOR TELEVISION RECEIVERS

William H. Slavik, Chicago, Ill., assignor to Motorola, Inc., Franklin Park, Ill., a corporation of Illinois Filed Nov. 27, 1963, Ser. No. 326,534

7 Claims. (Cl. 315—27)

ABSTRACT OF THE DISCLOSURE

The horizontal output tube in the horizontal deflection system is biased by means of a diode with one end coupled to a voltage which varies with the line voltage and the other end being coupled to a signal varying with beam intensity and with the line voltage. The scan width is related to the bias and thus is not affected by line voltage changes but is regulated with changes in beam intensity.

This invention relates generally to horizontal deflection and high voltage systems for television receivers, and more particularly to improved circuit arrangements for regulating horizontal scan width and high voltage over a range of cathode ray tube beam currents with a minimum of power dissipation and while maintaining a constant aspect ratio of the raster of the cathode ray tube with changes in A.C. line voltage.

The flyback type horizontal deflection and high voltage systems commonly used in present day commercial television receivers have high internal impedance and poor regulation characteristics. As a consequence changes in the cathode ray tube beam current that accompany changes in picture brightness cause a variation in current supplied to the horizontal deflection windings of the cathode ray tube and also cause the anode voltage supplied to the cathode ray tube to vary. This results in attending changes in deflection sensitivity of the cathode ray beam. It is also the practice in present day commercial television receivers to use an unregulated power to provide B+ voltage for supplying the anode and screen grid electrodes of the various tubes used in the receiver. In many instances a voltage doubler, having poor regulation characteristics, is needed to provide a sufficiently high B+ voltage. Thus, the B+ voltage utilized in various stages of the receiver varies with changes in the A.C. line voltage used to power the receiver, giving rise to further variations in deflection sensitivity.

In the instance of vertical deflection, wherein the deflection current is supplied independently of the high voltage system, reduced high voltage resulting from increased beam current results in an increase in vertical beam deflection. At the same time reduced A.C. line voltage powering the receiver will cause a decrease in vertical beam deflection for a given beam current. The horizontal deflection current, on the other hand, is supplied from the same system as the high voltage used for the cathode ray tube anode voltage, and a decrease in efficiency with a corresponding reduction in deflection current resulting from increased cathode ray tube beam current actually causes the horizontal scan width to decrease. There is also a decrease in horizontal scan width with a decrease in A.C. line voltage as in the instance of vertical deflection.

The effects arising from variations in high voltage and from changes in the size and shape of the raster are particularly noticeable in color television receivers utilizing trigun cathode ray tubes, which require substantially more beam current and appreciably higher anode and focusing voltages than single gun black and white cathode ray tubes. In addition to some of the adverse effects noticeable with respect to single gun black and white cathode ray tubes, variations in anode and focusing voltages and attending changes in the size and shape of the raster will result in poor color reproduction and fidelity. As a result, many present day color television receivers utilize a shunt voltage regulator tube in conjunction with the high voltage system. However, in addition to adding to circuit complexity and expense as a result of the additional components required by the shunt regulator itself, regulators of this type increase loading and losses of the high voltage transformer and increase dissipation.

In order to eliminate the shunt regulator in the high voltage system it has been proposed, particularly in systems utilizing beam power pentodes in the horizontal output stage for driving the high voltage transformer, to maintain constant high voltage and/or constant horizontal deflection current by varying either the screen grid voltage or the control grid bias of the output stage by a feedback signal derived from the high voltage output transformer. Varying the screen grid voltage results in a mode of operation which requires a higher screen grid voltage for the same average plate current. There is accordingly increased screen power dissipation in order to provide the desired high voltage and horizontal scan width regulation.

The prior art systems that have been proposed for varying control grid bias of the beam power pentode commonly used as the horizontal output stage are provided with a reference voltage in the feedback circuit that is substantially independent of line voltage variations to provide constant input power to the pentode over the full range of line voltage variations. Since it is necessary to operate the pentode such that zero control grid bias is reached at the end of horizontal scan under conditions of maximum cathode ray tube beam voltage and minimum line voltage, higher screen voltage and hence greater screen dissipation results. And since there are variations in vertical scan with line voltage while horizontal scan is maintained constant, there are wide variations in the aspect ratio of the raster with line voltage variations.

It is therefore an object of the invention to provide an improved regulation circuit for the horizontal output and high voltage system of a television receiver which regulates horizontal scan width and tends to regulate high voltage over a range of cathode ray tube beam currents while maintaining a constant aspect ratio of the raster.

Another object is to provide a simple, low cost horizontal scan width regulator which controls power input to the horizontal deflection and high voltage system of a television receiver to keep power dissipation at a minimum under varying line voltage conditions.

A further object of the invention is to provide an improved horizontal scan width regulator for use with flyback type horizontal deflection and high voltage systems that minimizes power dissipation in the horizontal output tube, maintains a constant aspect ratio of the raster with variations in A.C. line voltage, and improves high voltage regulation.

Other objects, as well as the features and attending advantages of the invention, will become apparent from the following description when taken in conjunction with the accompanying drawings, in which.

Figure 1:
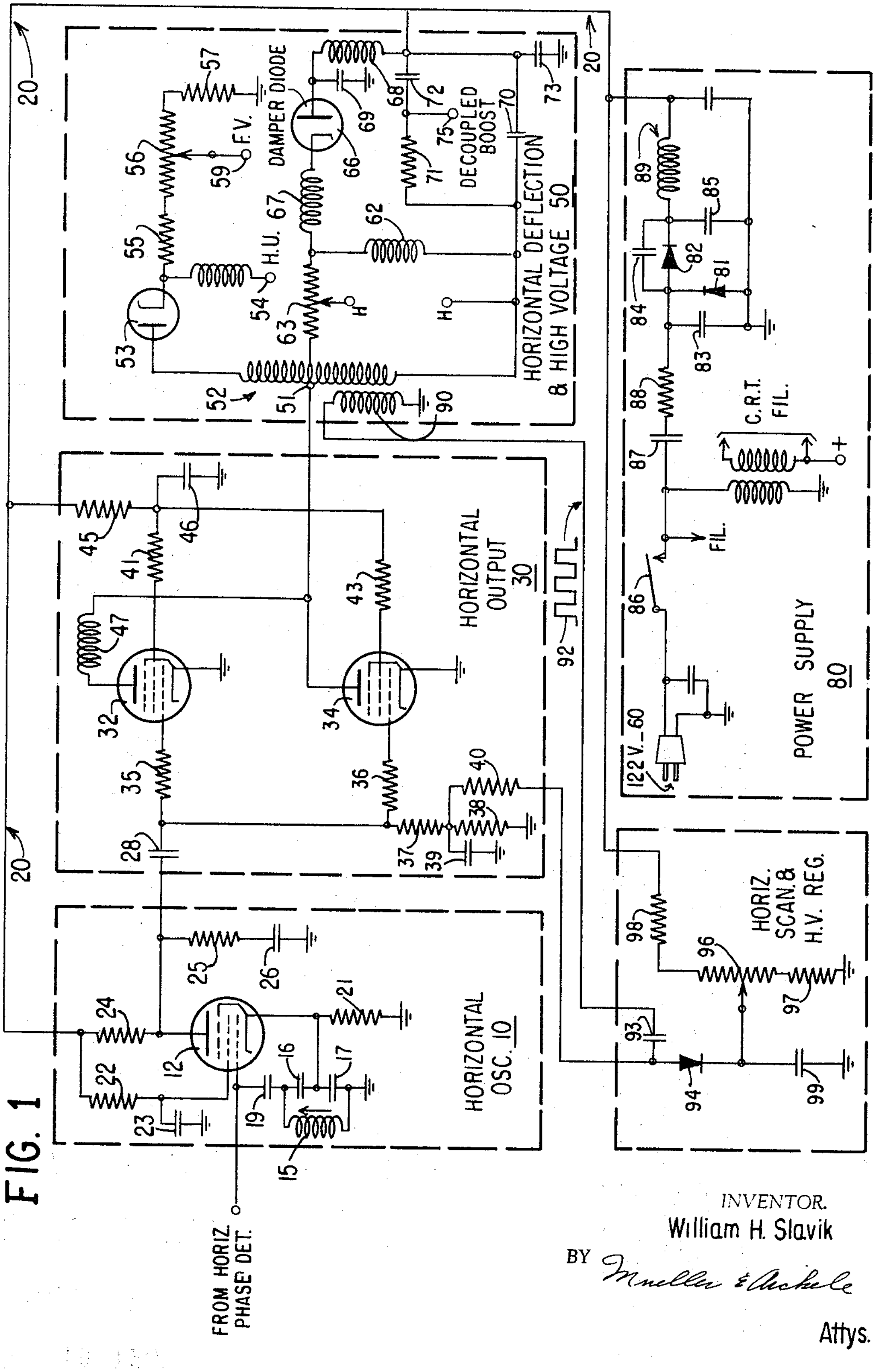
FIG. 1 is a schematic representation of portions of a television receiver employing the improved horizontal scan and high voltage circuit arrangement in accordance with the invention.

In practicing the invention there is provided a horizontal deflection and high voltage system including a horizontal output or flyback transformer with suitable high voltage and deflection circuit arrangements of the type commonly used in present day television receivers. The horizontal output transformer is energized by one or more beam power pentodes that are driven into conduction by sawtooth waves of horizontal deflection frequency applied to their control grids, and adapted to be periodically cutoff by flyback pulses occurring at the end of horizontal scan. The flyback pulses are stepped-up and rectified to provide the high voltage for the cathode ray tube.

A voltage pulse proportional in magnitude to horizontal deflection current and hence horizontal scan width is coupled to a control grid biasing network of the pentode, and a unidirectional conductive device such as a semiconductor diode is coupled between the control grid biasing network and a reference potential. The reference potential is derived from the B+ supply of the receiver and is of a polarity to reverse bias the unidirectional conductive device. The voltage pulse is applied across the unidirectional conductive device and causes it to conduct in response to pulses exceeding the reverse bias provided by the reference potential.

The differential voltage established by the relative values of the reverse bias for the unidirectional conductive device and the voltage pulse determined horizontal scan width, which values are selected to result in zero bias for the pentode at the end of horizontal scan and for maximum beam current or brightness of the cathode ray tube. When beam current or brightness is reduced to cause increased horizontal scan width the differential voltage increases proportionately in a direction that reduces plate current of the pentode and hence input power to the horizontal deflection and high voltage system. Thus, input power is varied with cathode ray tube beam current to maintain substantially constant horizontal scan width.

Changes in A.C. line voltage will also result in changes in input power supplied to the horizontal deflection and high voltage system by the pentode. Thus, at any given cathode ray tube beam current variations in B+ supplying the anode and screen grid of the pentode, arising from variations in line voltage, causes a change in current in the horizontal deflection windings that ordinarily varies the voltage pulse and hence the differential voltage which determines horizontal scan width a corresponding amount. However, since the reference potential that provides reverse bias for the diode is derived from the same B+ source as supplies the pentode, the reference voltage tends to track the B+ variations and horizontal scan width is responsive to changes in cathode ray tube beam current only. This operation allows the control grid of the pentode to reach zero bias for maximum brightness over a range of line voltage variations for reduced screen dissipation, and results in constant aspect ratio of the raster with line voltage variations.

A constant horizontal scan width with varying cathode ray tube beam current also tends to regulate the high voltage of the horizontal deflection and high voltage system. By slightly overcorrecting for changes in scan width, as may be conveniently achieved by changing the relative magnitudes of the voltage pulse derived from the high voltage transformer and of the reference bias provided for the unidirectional conductive device, the tendency for high voltage regulation is increased, with some loss of regulation of horizontal scan width. An optimum amount of overcontrol of horizontal scan width will provide a relatively high degree of regulation of both horizontal scan width and high voltage with cathode ray tube beam current variation.

Referring now to FIG. 1 of the accompanying drawing, horizontal oscillator 10 includes tube 12 which receives frequency stabilizing signals from the output of the horizontal phase comparator (not shown). A tuned circuit including variable inductor 15 and capacitors 16 and 17 is coupled between the control grid electrode of tube 12 and ground reference potential by capacitor 19. The cathode of tube 12 is connected to the junction of capacitors 16 and 17, which point is further returned to ground reference potential by resistor 21 to produce regenerative feedback and cathode bias for tube 12. The screen grid of tube 12 is connected to B+ lead 20 by resistor 22 and is further bypassed to ground reference potential by capacitor 23. The anode of tube 12 is connected to B+ lead 20 by resistor 24.

The screen grid of tube 12 forms an output electrode for sine wave oscillations of a modified Colpitts oscillator and is electron coupled to the anode of tube 12 to provide an output waveform which is shaped by the RC network including resistor 25 and capacitor 26. Tube 12 is conductive on positive peaks of the grid waveform due to the tuned circuit including inductor 15 and capacitors 16 and 17, resulting in voltage pulses at the screen grid. These voltage pulses, electron coupled to the anode of tube 12 are shaped by resistor 25 in series with capacitor 26 and fed thronugh capacitor 28 to horizontal output section 30 of the receiver.

The waveform coupled from horizontal oscillator 10 to horizontal output 30 by capacitor 28 is the usual sawtooth horizontal deflection wave, with sharp negative cutoff pulses occurring at the time of retrace of the electron beam of the cathode ray tube. This wave is applied to the control grids of horizontal output tubes 32 and 34 by resistors 35 and 36. Tubes 32 and 34 are beam power pentodes connected in parallel to provide the horizontal output stage of the receiver. The common junction of resistors 35 and 36 and capacitor 28 is returned to ground reference potential by the series combination of resistors 37 and 38. Resistor 38 is further bypassed to ground reference potential by capacitor 39. Grid bias for tubes 32 and 34 is supplied to the junction point between resistors 37 and 38 through isolation resistor 40 from a feedback network to provide substantially constant horizontal scan width and improved high voltage regulation in the manner to be subsequently described.

Screen grid voltage for tubes 32 and 34 is supplied through resistors 41 and 43, which have one side return to B+ lead 20 by resistor 45. Capacitor 46 bypasses the junction of resistors 41, 43 and 45 to ground reference potential. The anode of tube 32 is connected through coil 47 to the anode of tube 34. The anodes of both tubes 32 and 34 are further connected to tap point 51 on auto transformer 52 of the horizontal deflection and high voltage 50 of the receiver. This connection energizes auto transformer 52 with the output of tubes 32 and 34, and further provides means to supply B+ to the anodes of tubes 32 and 34 through auto transformer 52.

Horizontal output transformer 52 is an auto transformer tapped at successive points to provide the high voltage and focusing voltage for the cathode ray tube of the receiver, B+ boost, and horizontal deflection waves at terminals H—H. Terminals H—H are in turn connected to the horizontal winding of the deflection yoke (not shown) located on the neck of the cathode ray tube to result in horizontal scanning of the electron beam when auto transformer 52 is energized with the output of tubes 32 and 34 at tap point 51.

To provide high voltage the anode of rectifier 53 is connected to the top end of transformer 52 to produce a large step-up in voltage. High amplitude flyback pulses appearing in auto transformer 52 are rectified by diode 53 to provide a high voltage at terminal 54. A high voltage bleeder arrangement including resistors 55 and 57 and variable resistor 56 is connected between the cathode of diode 53 and ground reference potential. The tap point of variable resistor 56 provides focusing voltage for the cathode ray tube at terminal 59.

Tap point 51 on transformer 52 is also connected to one side of centering potentiometer 63. A parallel winding 62 is connected between the other end of potentiometer 63 and the bottom end of transformer 52. A voltage difference developed by these two windings across potentiometer 63 may be used as a horizontal centering control.

The cathode of damper diode 66 is connected to the junction of winding 62 and potentiometer 63 by coil 67. The anode of damper diode 66 is connected through coil 68 to B+ lead 20, and further bypassed to ground reference potential by capacitor 69. By this arrangement B+ is supplied through damper diode 66 to transformer 52, appearing at tap point 51, and hence the anodes of horizontal output tubes 32 and 34.

Bootstrap capacitor 70 is coupled between B+ lead 20 and the bottom end of transformer 52, which point is further returned to B+ lead 20 by the series combination of resistor 71 and capacitor 72. Capacitor 73 further returns B+ lead 20 to ground reference potential. This provides the conventional bootstrap circuit arrangement, with the junction point between resistor 71 and capacitor 72 providing a decoupled B+ boost potential for the receiver at terminal 75.

It is to be understood that transformer 52 may include additional windings (not shown) to supply gating pulses for the AGC of the receiver, and to supply a sawtooth wave to the input of the horizontal phase comparator of the receiver for comparison with horizontal synchronizing pulses derived from the received composite video signal. These and other additions and modifications of the basic horizontal deflection and high voltage system illustrated are known in the art and in detail form no part of the invention.

The power supply 80 of the receiver includes rectifiers 81 and 82 and capacitances 83, 84 and 85 connected as a voltage doubler circuit arrangement. The 60 cycle line voltage powering the receiver is coupled through on-off switch 86 and an isolation circuit including capacitor 87 and resistor 88 to be rectified by diodes 81 and 82, and in conjunction with capacitors 83–85 to provide a pulsating D.C. output voltage approximately double that provided by a conventional half wave rectifier circuit. One or more filter sections 89 provide the necessary filtering so that a substantially constant D.C. voltage is supplied to B+ lead 20 for distribution as required throughout the receiver. Additional connections are provided as needed for one or more series-string combinations of the filaments of various tubes of the receiver, and for providing filament voltage for the cathode ray tube. It is to be noted that other conventional D.C. power supplies, with or without power transformers and with or without a voltage doubler arrangement, may be utilized. The significant thing to note is that no voltage regulation or stabilization is provided with such supplies, and accordingly the B+ appearing on lead 20 varies with variations of the incoming 60 cycle line voltage used to power the receiver.

To provide regulation of the horizontal scan width and high voltage provided by horizontal deflection and high voltage system 50, auto transformer 52 further includes winding 90 to derive therefrom relatively high amplitude positive going voltage pulses 92 in response to the retrace or flyback pulses occurring at the end of scan of each horizontal line. One end of winding 90 is coupled by capacitor 93 to the anode of diode 94. Diode 94 may be any suitable unidirectional conductive device, preferably a semiconductor diode. The anode of diode 94 is also connected through isolation resistor 40 to the junction of resistors 37 and 38 in the grid circuit of horizontal output tubes 32 and 34. The cathode of diode 94 is direct current connected to the center arm of potentiometer 96. One end of potentiometer 96 is returned to ground reference potential through resistor 97 and the other end of potentiometer 96 is returned to B+, as supplied on lead 20 by power supply 80, through resistor 98. The setting of the center arm of potentiometer 96 supplies a reverse bias derived from B+ lead 20 to the cathode of diode 94. Capacitor 99 provides an A.C. return to ground reference potential for the cathode of diode 94.

Positive going voltage pulses 92, which as noted are derived from auto transformer 52 of horizontal deflection high voltage system 50, tend to make diode 84 conductive when exceeding the amplitude of the fixed bias applied from potentiometer 96 to the cathode of diode 94. Conduction of diode 94 produces a negative voltage at the junction point of resistors 37 and 38 to establish grid drive for tubes 32 and 34. The filtering action provided by resistor 40 and capacitor 39 maintains this voltage level between pulses, which occur at the 15.75 kc. horizontal scan rate.

An increase in the current through the horizontal deflection windings which are energized by horizontal deflection high voltage system 50 produces an increase in the amplitude of pulse 92. This in turn causes a greater voltage drop across resistor 38 and hence drives the junction between resistors 37 and 38 more negative to reduce input power to tubes 32 and 34. Conversely, a decrease in the current supplied to the horizontal deflection windings, as may arise as the result of increased cathode ray tube beam current, causes a decrease in the amplitude of pulses 92, producing a less negative grid bias for tubes 32 and 34 at the junction of resistors 37 and 38, thus increasing input power. This corrective feedback action results in substantially constant horizontal scan width and tends to regulate high voltage with changes in cathode ray tube beam current.

Changes in A.C. line voltage energizing power supply 80 will also cause a corresponding change in B+ appearing on lead 20. Thus, a decrease in line voltage will decrease both anode and screen voltages for pentodes 32 and 34 resulting in reduced current in the horizontal deflection windings. However, since the voltage developed across potentiometer 96 is also derived from the B+ provided on lead 20 by power supply 80, the reference voltage or reverse voltage for diode 94 follows changes in A.C. line voltage. Accordingly, the differential voltage indicative of changes between the reverse bias for diode 94 and voltage pulse 92 is independent of A.C. line voltage changes and determined only by cathode ray tube beam current changes. Stated another way, input power to horizontal deflection and high voltage system 50 is allowed to vary with A.C. line voltage changes.

The differential voltage or net bias (E bias) for tubes 32 and 34 is determined by the difference in amplitude between voltage pulses 92 and the reference bias for diodes 94 ($E$ bias$=E$ pulse $-E$ reference). E bias in turn is established to provide zero grid bias at the end of horizontal scan under conditions of maximum cathode ray tube beam current. Variations in cathode ray tube beam current which change the loading of horizontal deflection and high voltage system 50 and hence cause a reduction in horizontal deflection current result in similar variations in the amplitude of voltage pulse 92. This in turn produces the necessary changes in the differential voltage or E bias to control the power input to pentodes 32 and 34 to maintain substantially constant horizontal scan width and high voltage.

Figure 2:
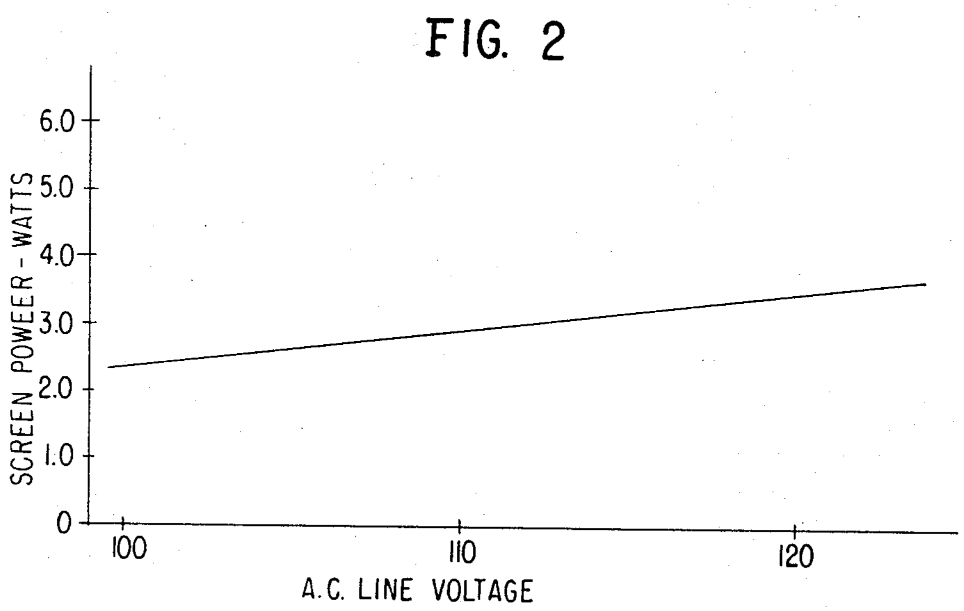
FIG. 2 is a curve illustrating the reduced screen dissipation of the horizontal output tube possible with the invention.

In order to provide zero grid bias and hence maximum plate current for pentodes 32 and 34 at the end of horizontal scan under conditions of maximum cathode ray tube beam current it is necessary to adjust screen grid voltage with regards to minimum A.C. line voltage and to establish a grid bias that produces the desired scan width at maximum A.C. line voltage. A constant reference potential for diode 94, tending to maintain input power constant with A.C. line voltage variations, requires a high screen grid voltage at minimum line voltage to provide the same plate current or input power at higher lines voltages. This in turn results in a high screen dissipation over the entire range of line voltage variations. However, by allowing the reference voltage for diode 94 to track line voltage variations the condition of zero grid bias for maximum cathode ray tube beam current is maintained over the range of line voltage variations and lower screen voltage and hence lower screen dissipation results. Curve 110 of FIG. 2 represents screen dissipation (in watts) for 12GC6 pentodes utilized as horizontal output tubes in the circuit arrangement of FIG. 1 incorporated in a color television chassis. It can be seen that screen dissipation, initially low, increases only slightly because of an increase in the B+ source supplying the screen grids. For a circuit arrangement wherein input power is maintained constant with A.C. line voltage variations there would be substantially greater screen grid dissipation under similar conditions.

Since both vertical deflection and horizontal scan width vary with changes in A.C. line voltage, allowing the reference potential for diode 94 to follow A.C. line voltage variations results in an accurate tracking of vertical size with horizontal width. This can be seen from curve 112 of FIG. 3, which shows the aspect ratio of the raster over a range of line voltage variations for a receiver utilizing the circuit arrangement of FIG. 1. It is to be noted that a substantially constant aspect ratio is maintained between minimum and maximum A.C. line voltage.

In a practical receiver utilizing a pair of 12GC6 pentodes energizing a horizontal deflection and high voltage system for a 21FJP22 color cathode ray tube and having horizontal scan width and high voltage regulation in the manner described in conjunction with FIG. 1, typical component values are:

| | | |
|---|---|---|
| Resistor **37** | ohms | 270,000 |
| Resistor **38** | do | 470,000 |
| Capacitors **39, 93** | microfarad | .005 |
| Resistor **40** | ohms | 100,000 |
| Diode **94** | (Motorola) | E503 |
| Potentiometer **96** | ohms | 50,000 |
| Resistor **97** | do | 68,000 |
| Resistor **98** | do | 22,000 |
| Capacitor **99** | microfarad | .05 |
| B+ | volts | 280 |

with the foregoing E (pulse) was 300 volts (peak above zero) and E (reference) was approximately half that value.

Figure 3:
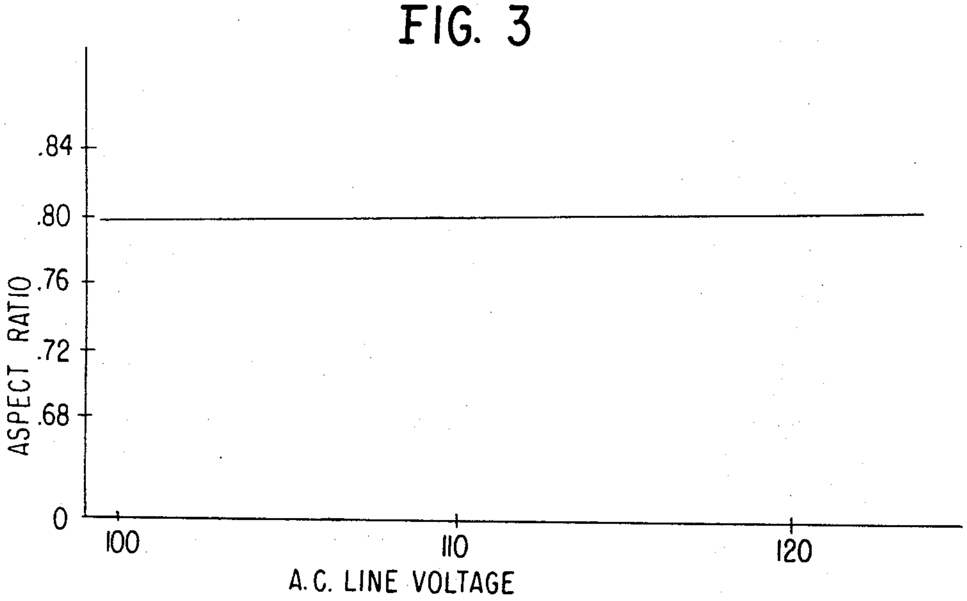
FIG. 3 is a curve illustrating the constant aspect ratio with changes in A.C. line voltage achieved by the invention.

The low screen grid dissipation and constant aspect ratio with line voltage variations thereby obtained is shown in FIGS. 2 and 3. It should be noted that ideally the above system maintains constant horizontal scan width, and responds to changes in horizontal deflection current in a manner that tends to regulate the high voltage. Improved high voltage regulation may be obtained by slight overcontrol of horizontal scan width, as, for example, by increasing the value of E (pulse).

The invention therefore provides an improved horizontal scan width and high voltage regulation system for the deflection and high voltage system of television receivers. The system maintains substantially constant horizontal scan width with changes in cathode ray beam current or brightness, and at the same time provides an improvement in high voltage regulation. The beam power pentodes used in the horizontal output stage reach zero grid bias at maximum cathode ray beam current over a full range of A.C. line voltage changes for greater efficiency and reduced screen grid dissipation. In addition, the aspect ratio of the raster of the cathode ray tube is maintained constant with line voltage over the full range of A.C. line voltage variations.

I claim:

1. In a television receiver having a cathode ray tube with a deflection winding to be energized for horizontal deflection of an electron beam in such tube, a horizontal sweep system including in combination, a horizontal output transformer coupled to the deflection winding, an electron amplifier device conductive through said transformer, said amplifier device having a control electrode, means connected to said control electrode for periodically driving said electron amplifier device into conduction to produce a sawtooth current in the deflection winding, a control rectifier circuit including means for deriving pulses from said horizontal output transformer and means direct current connected to said control electrode of said electron amplifier device, said rectifier circuit including a unidirectional conductive device, a source of reference potential to be energized by a power line voltage subject to variation, with the reference potential tracking variations in the power line voltage, means connecting said source of reference potential to said unidirectional conductive device for providing bias control of said electron amplifier device proportional to the difference between the amplitude of the pulses applied to said rectifier circuit and the reference potential varying with power line voltage variation.

2. In a television receiver having a cathode ray tube with an image screen and a deflection winding to be energized for horizontal deflection of an electron beam in such tube, a horizontal sweep and high voltage system including in combination, a horizontal output transformer coupled to the deflection winding, an electron amplifier device conductive through said transformer, said amplifier device having a control grid electrode, means connected to said control grid electrode for periodically driving said amplifier device into conduction to produce a sawtooth wave in said deflection winding, said horizontal output transformer having a high voltage winding, a high voltage rectifier connected to said high voltage winding for developing a potential to energize the screen of said cathode ray tube, a feedback network including means for deriving pulses from said horizontal output transformer, said feedback network coupled to said control grid electrode of said amplifier device, said feedback network including a unidirectional conductive device, a source of reference potential, said source of reference potential energized by a power line voltage subject to variation, with said reference potential tracking variations to said power line voltage, linear conduction means connecting said source of reference potential to said unidirectional conductor device for causing said feedback network to provide grid bias control of said amplifier device which is proportional to the difference between the amplitude of said pulses and said reference potential, and with said reference potential varying with power line variations.

3. In a television receiver having a power supply for converting an alternating current line voltage into direct current voltages subject to vary with the line voltage, a cathode ray tube, horizontal deflection windings for receiving deflection current to horizontally deflect the electron beam to form a raster, a horizontal deflection system including in combination, amplifier means having output and control electrode means, said output electrode means being coupled to the deflection windings for applying deflection current thereto, the value of which may change with the intensity of the electron beam and with the line voltage to vary the horizontal width of the raster, first circuit means coupled to the power supply for supplying a direct current reference voltage which varies with the line voltage, second circuit means to provide voltage pulses which vary in amplitude with the deflection current and with the line voltage, bias network means coupled to said first and second circuit means and responsive to the difference in amplitude between said voltage pulses and said reference voltage for developing a bias voltage which depends on variations in the intensity of the electron beam and is substantially independent of variations in the line voltage, means coupling said bias network to the control electrode means of said amplifier means for varying the bias thereon and maintaining a substantially constant horizontal raster width with variations in the intensity of the electron beam but allowing a varying horizontal width with variations in line voltage.

4. In a television receiver having a cathode ray tube, horizontal deflection windings disposed thereon for receiving deflection current to deflect an electron beam of the cathode ray tube to form a raster, and a power supply for converting an alternating current line voltage into direct current voltages subject to varying with the line voltage, a horizontal deflection system including in combination, amplifier means having control and output electrodes, with said output electrode coupled to the deflection windings for applying deflection current thereto the value of which may change with changes in the intensity of the electron beam and with changes in the line voltage to vary the horizontal width of the raster, a bias network including rectifier means having a pair of electrodes, first circuit means coupled to the power supply for supplying a reference voltage which varies with the line voltage to one electrode of said rectifier means, second circuit means to provide voltage pulses which vary in magnitude with the intensity of the electron beam and with the line voltage and coupled to the other electrode of said rectifier means to cause said bias network to develop a bias voltage indicative of the difference in amplitude between said voltage pulses and said reference voltage, which bias voltage depends on variations in the intensity of the electron beam but is substantially independent of variations in the line voltage, means coupling said bias network to the control electrode of said amplifier means for varying the bias thereon and maintaining a substantially constant horizontal raster with variations in the intensity of the electron beam but allowing a varying horizontal width with variations in line voltage.

5. The television receiver as set forth in claim 4 wherein said amplifier means comprises vacuum tube means having grid and anode electrodes respectively corresponding to said control and output electrodes.

6. The television receiver as set forth in claim 4 wherein said horizontal deflection system further includes a transformer coupling the output electrode of said amplifier means to the horizontal deflection windings, said transformer including an auxiliary winding for coupling the voltage pulses to said rectifier means.

7. The television receiver as set forth in claim 6, wherein said first circuit means includes a potentiometer means coupled between the power supply and ground reference potential and having a tap point thereon coupled to said one electrode of said rectifier means, said bias network including filtering means coupling said rectifier means to the control electrode of said amplifier means.

References Cited

UNITED STATES PATENTS

| | | | |
|---|---|---|---|
| 2,956,235 | 10/1960 | Fischman | 330—85 |
| 3,049,640 | 8/1962 | Bruch | 315—27 |
| 3,200,289 | 8/1965 | Kramer et al. | 315—27 |

JOHN W. CALDWELL, *Primary Examiner.*

R. K. ECKERT, *Assistant Examiner.*